(12) United States Patent
Kanika et al.

(10) Patent No.: US 12,426,658 B2
(45) Date of Patent: Sep. 30, 2025

(54) SMART HEAD PROTECTION GEAR (71) Applicant: TVS MOTOR COMPANY LIMITED, Chennai (IN)

(72) Inventors: Choudhary Kanika, Chennai (IN); Sai Praveen Velagapudi, Chennai (IN); Venkata Manga Raju Karnam, Chennai (IN)

(73) Assignee: TVS Motor Company Limited, Chennai (IN)

( * ) Notice: Subject to any disclaimer, the term of this patent is extended or adjusted under 35 U.S.C. 154(b) by 140 days.

(21) Appl. No.: 17/918,207

(22) PCT Filed: Apr. 10, 2021

(86) PCT No.: PCT/IN2021/050359
§ 371 (c)(1),
(2) Date: Oct. 11, 2022

(87) PCT Pub. No.: WO2021/205481
PCT Pub. Date: Oct. 14, 2021

(65) Prior Publication Data
US 2023/0144922 A1 May 11, 2023

(30) Foreign Application Priority Data
Apr. 11, 2020 (IN) .............................. 202041015753

(51) Int. Cl.
*A42B 3/00* (2006.01)
*A42B 3/04* (2006.01)
(Continued)

(52) U.S. Cl.
CPC ............ *A42B 3/0466* (2013.01); *B60R 21/01* (2013.01); *B60R 2021/0088* (2013.01)

(58) Field of Classification Search
CPC ................... A42B 3/0466; B60R 21/01; B60R 2021/0088
See application file for complete search history.

(56) References Cited

U.S. PATENT DOCUMENTS 4,015,294 A * 4/1977 O'Neill ................... B63C 11/06
2/421
4,130,803 A * 12/1978 Thompson ............... H04R 1/10
455/344

(Continued)

FOREIGN PATENT DOCUMENTS

CN 214207369 U * 9/2021
CN 116746729 A * 9/2023 ........... A42B 3/0406

(Continued)

OTHER PUBLICATIONS

International Search Report issued in corresponding International Application No. PCT/IN2021/050359 mailed Oct. 26, 2021 (5 pages).

(Continued)

*Primary Examiner* — Peter D Nolan
*Assistant Examiner* — Peter Y Ning
(74) *Attorney, Agent, or Firm* — Osha Bergman Watanabe & Burton LLP (57) ABSTRACT

A smart head protection gear safety system includes: a head protection gear comprising a shell including outer and inner circumferential surfaces and lateral surfaces, the inner circumferential surface being configured to support one or more pulse oximeter sensors, to be functionally coupled to at least one infrared (IR) sensor, and to be functionally coupled to at least one buckle switch; a transmitter module being disposed inside the head protection gear, the transmitter module being configured to transmit signal outputs from one of the pulse oximeter sensors, the infrared (IR) sensor and the buckle switch to a receiver module, the (Continued)

receiver module being installed on a vehicle, the receiver module being configured to receive the signal output from the transmitter module; and a microcontroller module being configured to activate the vehicle when the receiver module receives the signal output from the transmitter module.

12 Claims, 11 Drawing Sheets

(51) Int. Cl.
  *B60R 21/01* (2006.01)
  *B60R 21/00* (2006.01)

(56) References Cited

U.S. PATENT DOCUMENTS

| | | | | |
|---|---|---|---|---|
| 4,982,452 | A * | 1/1991 | Chaise | A42B 3/08 |
| | | | | 2/421 |
| 6,003,156 | A * | 12/1999 | Anderson | A42B 3/0466 |
| | | | | 340/432 |
| 7,841,026 | B2 * | 11/2010 | Makris | B32B 27/00 |
| | | | | 2/412 |
| 7,877,126 | B2 * | 1/2011 | Hannula | A61B 5/14552 |
| | | | | 600/340 |
| 9,579,060 | B1 * | 2/2017 | Lisy | A61B 5/165 |
| 2009/0227852 | A1 * | 9/2009 | Glaser | A61B 5/6816 |
| | | | | 341/20 |
| 2013/0215281 | A1 * | 8/2013 | Hobby | H04B 1/385 |
| | | | | 348/207.1 |

FOREIGN PATENT DOCUMENTS

| | | | |
|---|---|---|---|
| JP | 2019035161 A | * | 3/2019 |
| JP | 2020007670 A | * | 1/2020 |

OTHER PUBLICATIONS

Written Opinion issued in corresponding International Application No. PCT/IN2021/050359 mailed Oct. 26, 2021 (7 pages).

\* cited by examiner

SMART HEAD PROTECTION GEAR

TECHNICAL FIELD

The present subject matter relates to a safety protective gear for a vehicle. More particularly, but not exclusively to a smart head protection gear to ensure safety of the rider on the road.

BACKGROUND

Injuries due to road traffic accidents are one of the leading causes of death around the world. Among users of the two wheelers i.e. motorcycles, scooter and bicycles, head and neck injuries are very common and are mainly responsible for severe injuries and disabilities. A head protection gear, for example, a head protection gear and the like to protect the head of the rider and the pillion is very essential as it reduces the risk of serious head and brain injuries by reducing the impact of force or collision to the head during an accident. The absence of the head protection gear on the rider head increases the chances of serious injuries to the rider. Thus, ensuring that the rider has properly worn the head protection gear ensures his safety on the road.

DETAILED DESCRIPTION OF THE INVENTION

As already known in the art, an existing smart-helmet provided with a mechanism includes an ignition-based control unit and make sure that the bike will not start if the rider has not worn the head protection gear. It contains a switch in the helmet, the switch when activated sends a signal to the bike ignition control unit and thus enables the rider to start the bike. It suffers a limitation as it does not ensure any method to keep a check whether the rider has not bypassed the switch on the helmet with hands and thus has started the bike without wearing the helmet. In addition, it does not even explain the type of ignition switch used and its functionality and thus pose a limitation and a lack of a proper design for implementation.

Another existing smart helmet uses Force sensing resistor to ensure that the rider has worn the helmet and thus activates the ignition. As the rider can easily activate the Force Sensing Resistor with fingers or any other material so it has the possibility that the rider will bypass this and start the bike.

Another existing smart head protection gear uses passive infrared sensor within the helmet which make use of human motion to detect that the rider has worn the helmet or not. This can be very easily bypass by the waving motion of the hand inside the helmet thus has loophole in ensuring that the rider has worn the head protection gear or not before riding.

Another existing smart helmet for two-wheelers uses a proximity sensor and LED for detecting whether the rider has worn the helmet or not and can be easily bypassed by the rider with his hands or any other material and thus it does not serve the desired purpose of enabling the rider to start the bike only when the helmet is properly placed on his head.

Another such helmet uses a push button and thus fails on the same aspect which is listed for the above head protection gears.

Another existing helmet uses ultrasonic sensor and make use of the time of flight principle to ensure the placement of the head protection gear on the rider head and thus suffers the limitation of bypassing the sensory input with hands or any other means.

The known art as explained above includes a number of methods for ensuring that the rider has worn the helmet and thus allowing him to start the bike but they suffer from certain limitations as these systems do not cater the fact that rider can intentionally or unintentionally enable these inputs by bypassing them with hand, fingers, or placing the head protection gear on a dummy or mannequin and thus can start the bike. This puts the rider's safety at risk. There is also a chance that the rider might remove the helmet on the go and this put him again at a safety risk.

Hence, there is a need of having a smart head protection gear safety system and one or more methods for the smart head protection gear which can address the above mentioned drawbacks and the above-mentioned limitations and ensures that the rider is not able to bypass these inputs on the head protection gear with some quick fix trick and thus is safe while riding his/her vehicle.

With the above objectives in view, the present invention discloses a safe ride head protection gear with a improved design which will ensure the safety of the rider during riding.

It is an object of the present invention to provide a head protection gear design with a plurality of different sensors installed on the head protection gear. The said design of the head protection gear makes sure that the rider has properly worn the head protection gear with the help of these sensory inputs and enable that the rider will not be able to start the bike unless the head protection gear is properly placed on his head.

It is another object of the present invention to provide optimal locations for different sensors such as infrared sensor and pulse oximeter sensor on the head protection gear. With these particular sensors in these specific locations, the objective of ensuring that the rider will not be able to bypass all the sensors input at once either with hand, fingers, dummy, mannequin or any other means.

It is another object of the invention that the design is a closed loop design as it also makes a check that the rider will not be able to remove the head protection gear during his entire journey because as soon as he removes the head protection gear, the ignition of the vehicle will stall. It fulfills the objective that the rider will wear the head protection gear during the entire duration of riding his vehicle.

It is another object of this invention that the design includes a head protection gear buckling reminder unit that will remind the rider to buckle-up or engage the locking strap of the head protection gear. As is observed only wearing the head protection gear does not serve the purpose of safety unless the head protection gear is buckled up. Thus, the said safe ride head protection gear removes the mentioned shortcomings present in the already present head protection gears by reminding the rider to buckle the head protection gear.

Summary provided above explains the basic features of the invention and does not limit the scope of the invention. The nature and further characteristic features of the present invention will be made clearer from the following descriptions made with reference to the accompanying drawings.

The detailed description is described with reference to the accompanying figures. The same numbers are used throughout the drawings to reference like features and components.

The present subject matter disclosed herein relates to a safe ride head protection gear for a two-wheeled vehicle. This invention may, however, be embodied in many different forms and should not be construed as limited to the embodiments set forth herein; rather those embodiments are provided so that this disclosure will be thorough and complete, and fully convey the scope of the invention to those skilled in the-art.

Figure 1:
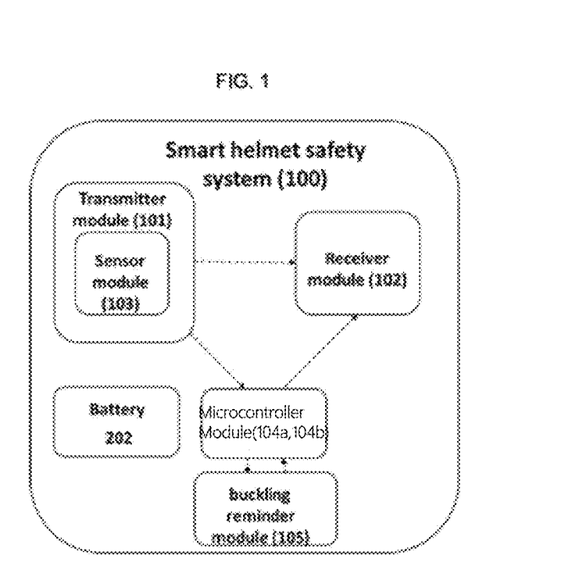
FIG. 1 illustrates a smart head protection gear safety system for a head protection gear

FIG. 1 illustrates a smart head protection gear safety system for a head protection gear. The system (100) includes a microcontroller module (104a, 104b) configured to control plurality of functions of said system (100). A transmitter module (101) disposed inside a head protection gear, the transmitter module (101) is configured to transmit one or more parameters outputted from a sensor module (103) to said microcontroller module (104a, 104b). A receiver module (102) is installed on the vehicle, the receiver module (102) is configured to receive the one or more parameters from the microcontroller module (104a, 104b).

In another embodiment, the system (100) includes a head protection gear buckling strap reminder module (105) mounted on the head protection gear, the head protection gear buckling reminder module (105) is configured to interact with the microcontroller module (104a, 104b).

The system further includes a sensor module (103) which includes at least one infrared sensor, at least one pulse oximeter sensor.

The system includes a receiver module (102) is attached to a TCI unit (304) of the vehicle.

The head protection gear buckling reminder module (105) includes a contact type limit switch.

Figure 2A:
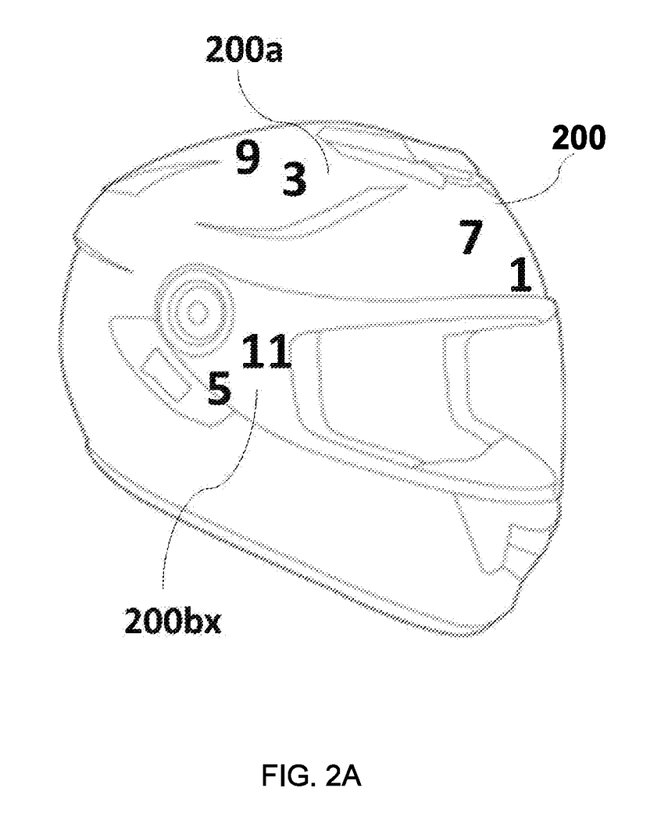
FIG. 2a shows the left and the right-hand side view of the head protection gear and the locations of infrared sensor.
Figure 2B:
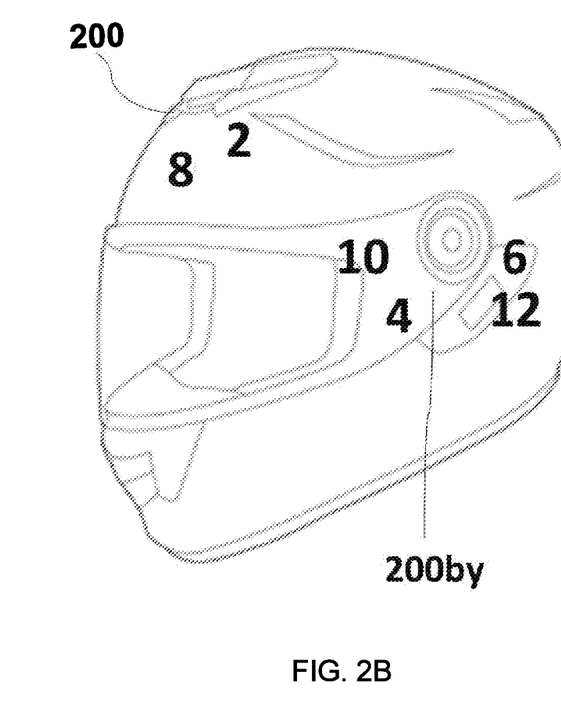
FIG. 2b shows the position of the Pulse oximeter sensor on the head protection gear.

FIG. 2 depicts the smart head protection gear, as proposed in the invention. In FIGS. 2a and 2b, the left and the right-hand side view of the head protection gear. The head protection gear (200) includes a shell (200a) configured with an outer circumferential surface and an inner circumferential surface. The lateral portions of the shell (200a) includes lateral surfaces (200bx, 200by) comprising a right lateral surface (200bx) and a left lateral surface (200by). The inner circumferential surface of the shell (200a) is configured to support one or more pulse oximeter sensors (7,8,9,10,11,12). In particular, at least one of the right lateral surface (200bx) and the left lateral surface (200by) is configured to support one or more pulse oximeter sensors (10,11). Whenever, the head protection gear (200) is worn by the rider, the pulse oximeter sensors (10, 11) are exactly situated near the earlobes of the rider.

Figure 3:
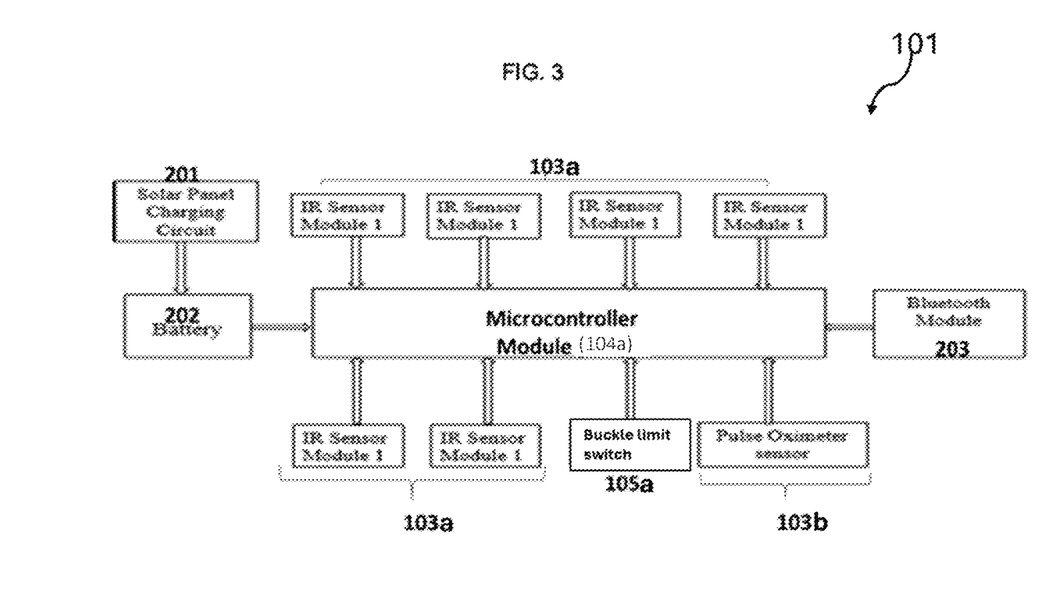
FIG. 3 shows a block diagram of various component of the head protection gear transmitter unit.

In an alternate embodiment, the inner circumferential surface of the shell (200a) is configured to be functionally coupled to at least two IR sensors (1,2,3,4,5,6), the right lateral surface (200bx) and said left lateral surface (200by) is configured to support one or more pulse oximeter sensors (10,11), and the inner circumferential surface is configured to be functionally coupled to at least one buckle limit switch (105a) (shown in FIG. 3).

Figure 2C:
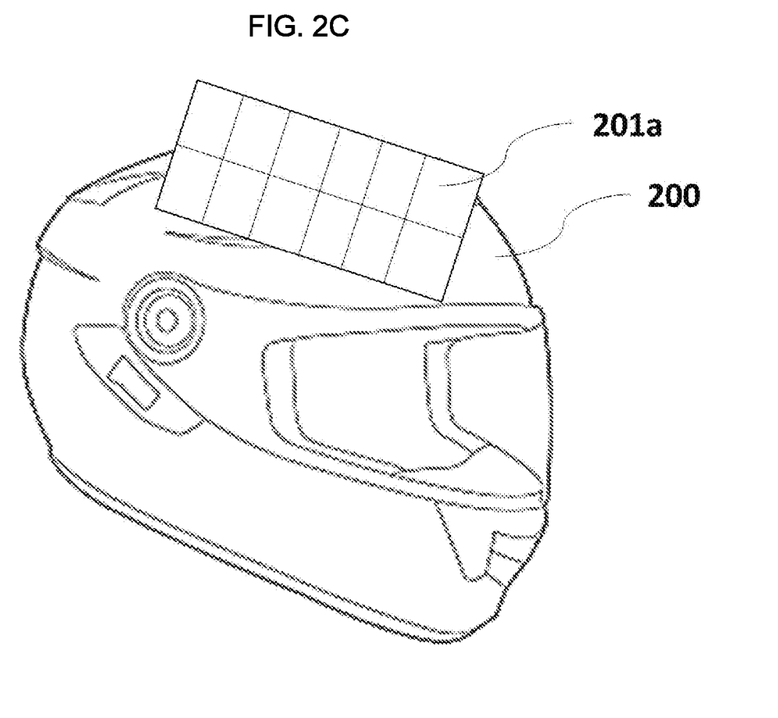
FIG. 2c illustrates the right perspective view of the head protection gear with the solar charging unit.

FIG. 2a and FIG. 2b provide the locations where the infrared sensors (1,2,3,4,5,6) are placed in the head protection gear. The position of the Pulse oximeter sensor (7,8,9, 10,11,12) is marked in FIG. 2a and FIG. 2b. FIG. 2c illustrates the right perspective view of the head protection gear (200) displaying the solar charging unit (201a).

FIG. 3 depicts the block diagram of the transmitter unit. The Transmitter Module (101) is placed inside the head protection gear and contains different sensors at different locations. One or more checks are performed with the sensory circuitry inside the head protection gear to ensure that the rider has worn the head protection gear or not and if all the conditions are met, the transmitter module (101) gives the command to the receiver module (102). The transmission takes place with a wireless device, for example, a Bluetooth module (203). The figure represents all the components with block diagram of the circuit, which is the Transmitter Module (101) which comprises 6 infrared (IR) Sensor Module (103a), 1 Pulse oximeter Sensor (103b), Buckle limit switch (105a), Microcontroller module (104a), battery (202), Bluetooth module (203) and a solar charging circuit (201) and a solar panel (201a).

In an embodiment, at least five IR sensor Modules (103) are placed at different location and once the rider has worn the head protection gear (200) on the head all the sensor (103) will be activated at once otherwise no activation will be there. All the sensors are placed such that they cover whole head of the rider. And only proper placement on the head can result in the activation of all the six sensors at once.

In another embodiment, Pulse oximeter Sensor is placed on the left side of the head protection gear at place where the ear of the rider comes in contact with the head protection gear. The sensor will only show a reading when it detects a heart rate which can only be there if the head protection gear is wore by a human and not a dummy.

According to another embodiment, a Buckle limit switch (105a) is incorporated which comprises of a contact type limit switch which get activated when the buckle of the head protection gear (200) is closed.

The microcontroller (104a) processes all three inputs from at least any of the 3 inputs, which are from pulse oximeter sensor, Infrared sensors and from buckle limit switch sensor, and gives command to the Bluetooth transmitter module whether to transmit the signal to the receiver or not. Whenever the smart head protection gear helmet is worn by the rider, the pulse oximeter sensors are placed near the earlobes of the rider, because of which the pulse rate of the rider is picked up easily without much interference and the same undisturbed pulses are sent to the microcontroller (104a) for further processing.

A battery (202) is provided to meet the power requirement of the circuitry. To manage the power requirement, as per an additional embodiment, a separate a solar charging circuit and a solar panel may also be incorporated on the head protection gear to take advantage of the energy of sun and charge the battery on the go.

Figure 4:
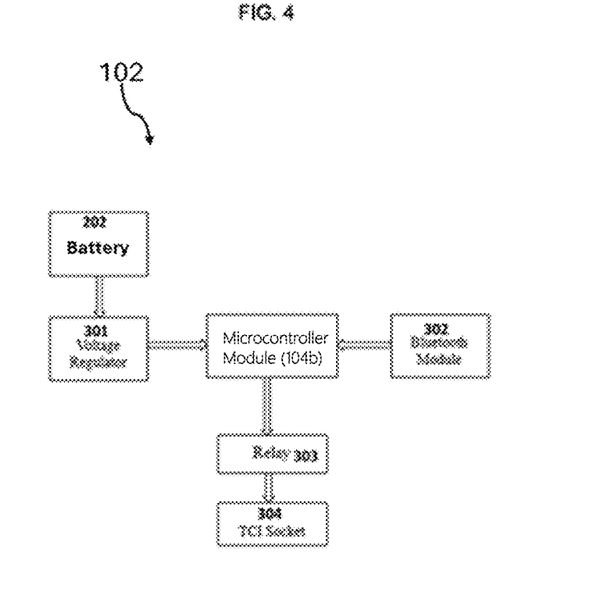
FIG. 4. shows a block diagram of the various components of the receiver unit installed on the bike

FIG. 4 depicts the block diagram of the receiver module. The Receiver Module (102) which is installed on the vehicle on receiving the input from the transmitter gives the command to start the bike by switching on the TCI Controller (304). The receiver module is mounted inside the vehicle and is directly attached to the TCI (304) of the vehicle. It consists of a Bluetooth Receiver (302), Microcontroller (104b), an Indicator LED, a transistor and battery.

The Bluetooth module (302) receives the command from the Bluetooth transmitter module which is there on the head protection gear. Once, it receives the input that rider has worn the head protection gear, the microcontroller (104b) of the receiver module sends the input to transistor (304).

The transistor will work as a switch here and will be in ON condition and closes the switch only if the receiver receives a positive input from the transmitter and turns OFF for the opposite case. An indicator LED is also placed which will glow to indicate the completion of the circuit.

A relay (303) will be activated once transistor is in on condition. And will complete the circuit on the other side which is attached to the TCI Controller and this in turn enables the ignition of the vehicle.

The power requirement of the receiver moudle is met with the battery (202) of the vehicle itself and a voltage regulator (301) is used to regulate the voltage as required by the microcontroller (104b).

Figure 5A:
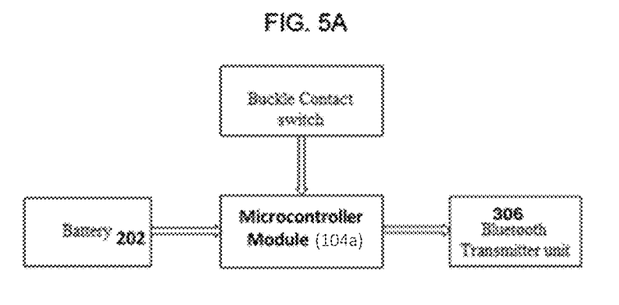
FIGS. 5a and 5b shows a block diagram of the head protection gear buckling reminder transmitter and speedometer receiver unit FIG. 6. shows a flow chart for the head protection gear transmitter unit FIG. 7. shows a flow chart for the head protection gear receiver unit FIG. 8. shows a flow chart for the head protection gear buckling reminder unit
Figure 5B:
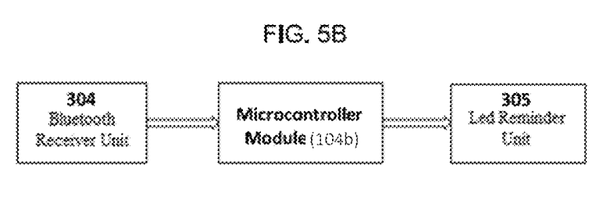

FIG. 5(a) illustrates the block diagram of the head protection gear buckling unit installed on the head protection gear. FIGS. 5a and 5b are the block diagram of different components of the head protection gear buckling reminder transmitter and speedometer receiver unit respectively. Head protection gear buckling reminder transmitter unit is installed on the head protection gear and consists of a Bluetooth transmitter unit (306), microcontroller (104a) and a battery unit (202). Head protection gear buckling reminder receiver unit is installed on the speedometer of the bike and consists of microcontroller (104b) module, Bluetooth receiver unit (304) and a LED reminder unit (305).

Figure 6:
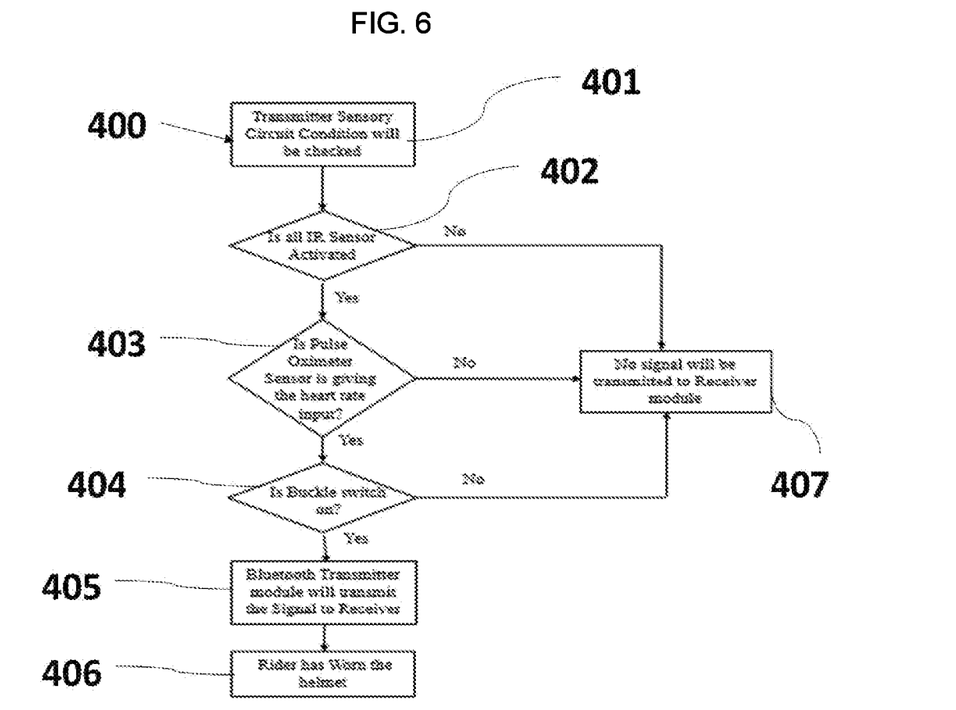
Figure 7:
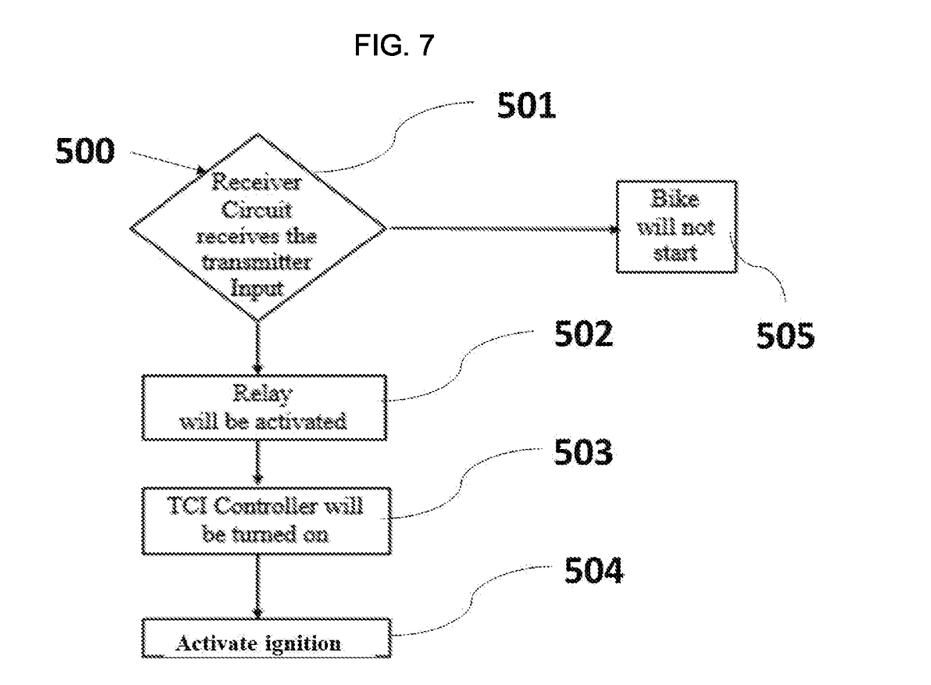

FIG. 6, 7 illustrates the flow chart of the transmitter and receiver unit of the working of the transmitter and receiver module. The test starts once the rider wears the head protection gear on the head. The IR sensor Module inputs, POS sensor input and buckle switch input are checked one after another.

At step (401), the sensory circuit condition will be checked by the transmitter. In particular at steps (402) and at step (403), the activation of all the infra-red sensors (103) and the activation of the pulse oximeter sensor is checked respectively. At step (403), if the pulse oximeter sensor is sending pulse of the heart rate of the rider, then at (404), a buckle switch activation is checked. Further, at step (405), the Bluetooth transmitter unit (306) transmits the signal to the receiver unit. Further, at step (406), the system confirms that the rider has worn the head protection gear.

Further at step (407), if any of the three conditions is found to be false, the signal will be processed by the microcontroller and the transmitter will not send the signal to the receiver unit to start the TCI/CDI Controller and hence will result in not starting the bike.

If all the conditions are found to be true, the transmitter will send the signal to the receiver module and the microcontroller of the receiver module will activate the relay and the TC/CDI controller circuit will be closed thereby enabling the engine to be started as indicated in the steps (405) and (406).

FIG. 7 illustrates a flow diagram for working of the receiver module. The receiver module (500) after receiving the signal from the transmitter module at shown in the step (501), activates the relay unit as indicated in the step (502), further, the TCI controller is switched ON as indicated in the step (503) and the vehicle ignition will be activated as indicated in the step (504). If the inputs are not received by the receiver unit, then the vehicle will not start as indicated in the step (505).

Figure 8:
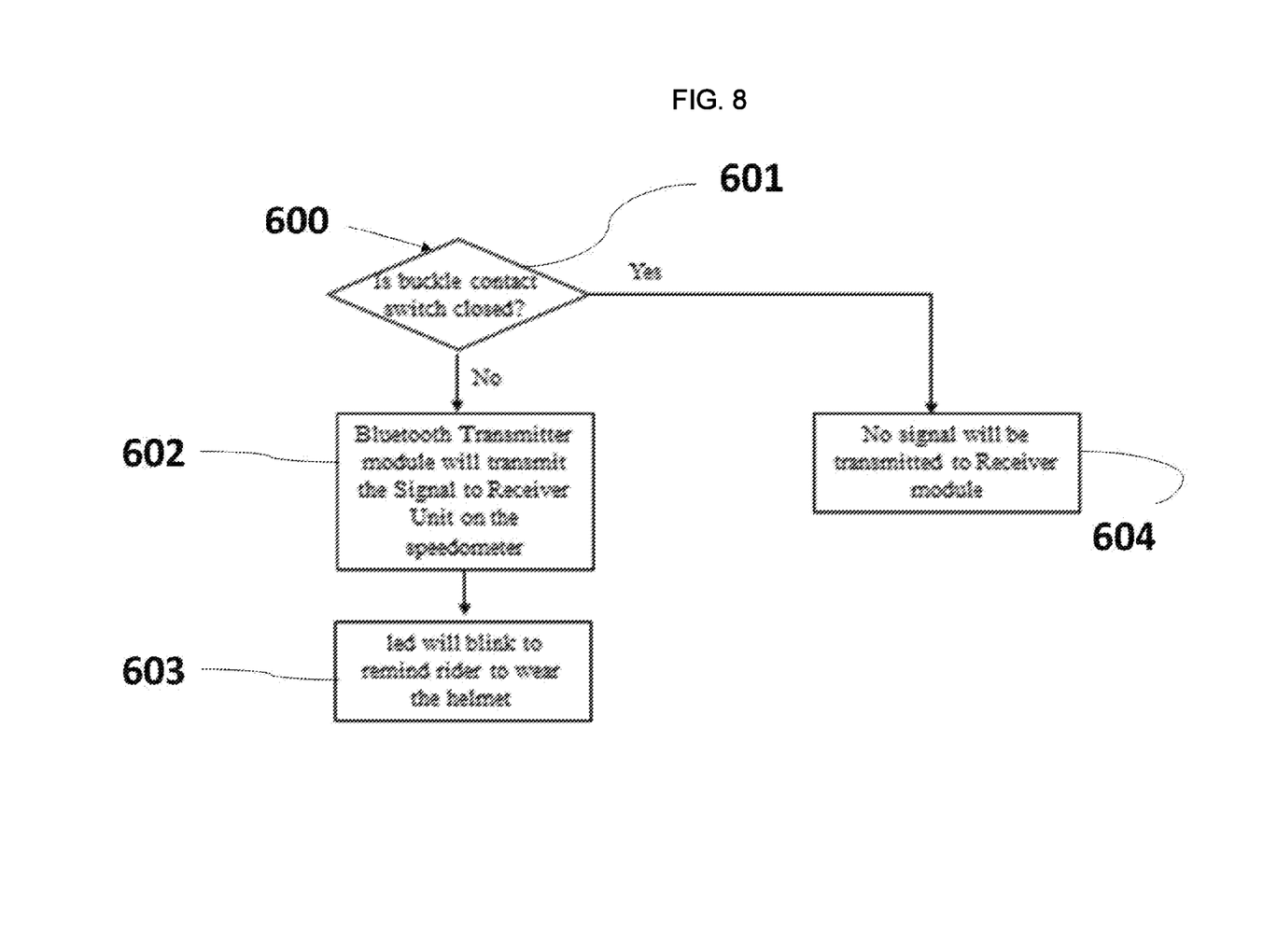

FIG. 8 explains the flow chart of working of the head protection gear buckling unit. If the head protection gear buckle is closed properly, the contact switch will be closed and no signal will be sent by the transmitter unit as indicated in step (601). If the head protection gear buckle is not tied or strapped properly, the contact switch will be open and the Bluetooth transmitter unit (306) on the head protection gear will sent a signal to the Bluetooth receiver unit on the instrument cluster as indicated in the step (602) and the microcontroller will command the led on the instrument cluster to activate, for example, blink in a predefined fashion to remind the rider to buckle the head protection gear properly as indicated in the step (603).

Figure 9:
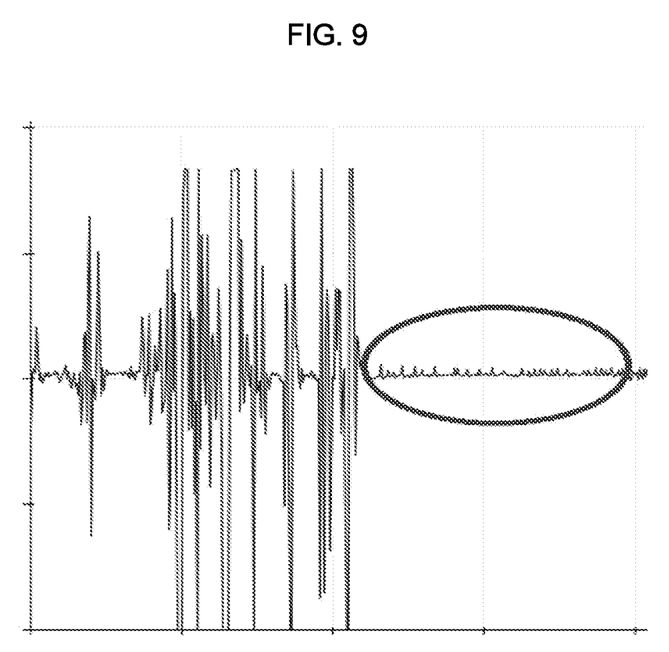
FIG. 9 shows the plots of pulse oximeter's oxygen saturation measurement with time when the sensor is placed at the forehead of the user

FIG. 9 illustrates the Pulse Oximeter oxygen saturation measurement. The graphical representation illustrates the measurement with time when the sensor is placed at sides of forehead. The graphical representation illustrates the sensor readings when the head protection gear is put on the sides of the forehead and whenever the head protection gear is not put on the sides of the forehead. The initial portion of the graphical representation shows the unstable reading and the effect of motion, which is being sensed by the sensors mounted around the region of the sides of the forehead. The graphical representation also illustrates the region where the head protection gear is not on the rider head, wherein the motion is not at all sensed by the sensors.

Figure 10:
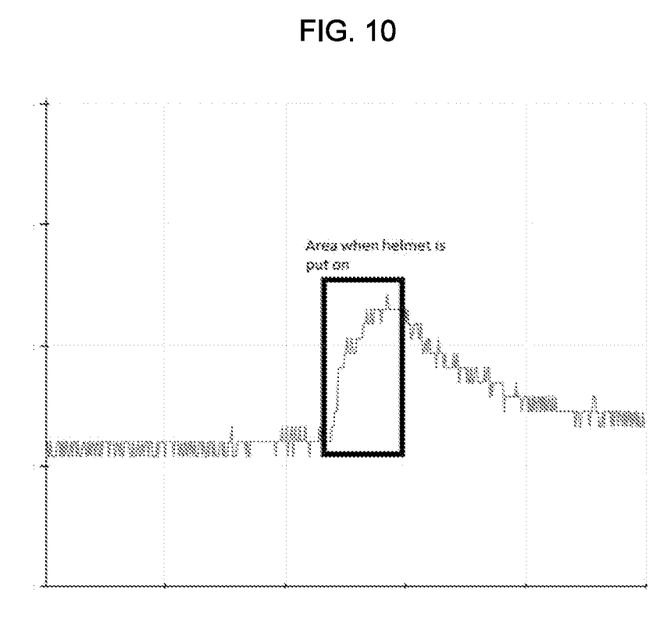
FIG. 10 shows the plots of pulse oximeter's oxygen saturation measurement with time when the sensor is placed on the earlobe of the user

FIG. 10 shows the pulse oximeter sensor whenever the head protection gear is put near the ear lobe. The graphical representation illustrates the sudden rise in the readings of the graph, whenever the head protection gear is put on the region near the earlobe and helps the microcontroller to identify when the pulse is detected i.e. the time when the head protection gear is put on by the rider on the head. However, the rest of the graphical representation, before and after the spike in the readings, represents whenever there is no readings picked up by the sensors, whenever the sensors are placed away from the earlobes of the rider. The inputs picked up by the sensors are provided as inputs to the microcontroller.

It is to be understood that the aspects of the embodiments are not necessarily limited to the features described herein. Many modifications and variations of the present subject matter are possible in the light of above disclosure.

BRIEF DESCRIPTION OF REFERENCE NUMERALS infrared sensors—1,2,3,4,5,6
Smart head gear safety system—100
transmitter module—101
receiver module—102
sensor module—103
microcontroller module—104a, 104b
buckling reminder module—105
buckle limit switch—105a head gear—200
charging unit—201a
battery—202
Bluetooth module—203
voltage regulator—301
Bluetooth Receiver—302
Relay—303
TCI unit—304
led unit—305
Bluetooth transmitter unit—306

We claim:

1. A smart head protection gear safety system for a rider of a vehicle, comprising:
a receiver module; and
a head protection gear comprising a shell and a transmitter module, wherein
the shell includes an outer circumferential surface and an inner circumferential surface,
the inner circumferential surface of the shell is configured to support one or more pulse oximeter sensors,
the inner circumferential surface of the shell is configured to be coupled to at least one infrared (IR) sensor,
the inner circumferential surface of the shell is configured to be coupled to at least one buckle switch,
the transmitter module is disposed inside the head protection gear and is configured to transmit a signal output from one of the pulse oximeter sensors, the infrared (IR) sensor, and the buckle switch to the receiver module,
the receiver module is installed on the vehicle and is configured to receive the signal output from the transmitter module and to confirm, based on the signal, that the head protection gear is worn by the rider, and
the receiver module comprises a microcontroller module configured to activate a relay unit of the vehicle when the receiver module receives the signal output from the transmitter module.

2. The smart head protection gear safety system as claimed in claim 1, wherein at least one of a right lateral surface and a left lateral surface of the head protection gear are configured to support the pulse oximeter sensors.

3. The smart head protection gear safety system as claimed in claim 1, further comprising:
a head protection gear buckling reminder module mounted on the head protection gear, the head protection gear buckling reminder module being configured to interact with the microcontroller module.

4. The smart head protection gear safety system as claimed in claim 3, wherein the head protection gear buckling reminder module includes a contact type limit switch.

5. The smart head protection gear safety system as claimed in claim 1, further comprising:
a battery module to provide power to the smart head protection gear safety system.

6. The smart head protection gear safety system as claimed in claim 5, wherein the battery is powered by a set of solar panels disposed on top of the head protection gear.

7. The smart head protection gear safety system as claimed in claim 1, wherein the receiver module is attached to a TCI unit of the vehicle.

8. The smart head protection gear safety system as claimed in claim 1, wherein the at least two IR sensors are disposed around a circumference of the head protection gear.

9. The smart head protection gear safety system as claimed in claim 1, wherein the pulse oximeter sensor is disposed around a circumference of the head protection gear.

10. A method for activating a vehicle by a receiver module based on operation of a smart head protection gear safety system, the method comprising:
checking for one or more conditions of a sensor module;
checking if at least one of an IR sensor and a pulse oximeter sensor are activated;
checking for activation of a buckle switch;
transmitting a confirmation signal from a transmitter module of the smart head protection gear safety system to the receiver module in the vehicle only after the checks are performed;
confirming, by the smart head protection gear safety system, based on the confirmation signal that a head protection gear is worn by a rider; and
activating a relay unit of the vehicle when the receiver module receives the confirmation signal.

11. The method as claimed in claim 10, the method comprising:
receiving the confirmation signal from the transmitter module;
activating a relay unit of the vehicle;
switching ON one of a TCI unit and a CDI unit; and
activating the vehicle.

12. The method as claimed in claim 10, the method comprising:
transmitting signals from the sensor module to a receiver unit on an instrument cluster, if the buckle unit is disabled; and
indicating on the instrument cluster of the vehicle, the buckle unit is disabled.

* * * * *